United States Patent
Kobayashi

(10) Patent No.: US 9,109,662 B2
(45) Date of Patent: Aug. 18, 2015

(54) WAVE GENERATOR FOR WAVE GEAR DEVICE

(75) Inventor: Masaru Kobayashi, Azumino (JP)

(73) Assignee: HARMONIC DRIVE SYSTEMS INC., Shinagawa-Ku, Tokyo (JP)

( * ) Notice: Subject to any disclaimer, the term of this patent is extended or adjusted under 35 U.S.C. 154(b) by 186 days.

(21) Appl. No.: 13/810,846

(22) PCT Filed: May 23, 2012

(86) PCT No.: PCT/JP2012/003376
§ 371 (c)(1),
(2), (4) Date: Jan. 17, 2013

(87) PCT Pub. No.: WO2013/175532
PCT Pub. Date: Nov. 28, 2013

(65) Prior Publication Data
US 2013/0316867 A1    Nov. 28, 2013

(51) Int. Cl.
*F16H 37/04* (2006.01)
*F16H 1/32* (2006.01)
*F16H 49/00* (2006.01)

(52) U.S. Cl.
CPC .............. *F16H 1/32* (2013.01); *F16H 49/001* (2013.01)

(58) Field of Classification Search
USPC ......................................................... 74/640
See application file for complete search history.

(56) References Cited

U.S. PATENT DOCUMENTS

| | | | | |
|---|---|---|---|---|
| 2,906,143 | A | * | 9/1959 | Musser ........................... 74/640 |
| 2,931,249 | A | * | 4/1960 | Musser ........................... 74/640 |
| 4,776,708 | A | * | 10/1988 | Carlson ........................ 384/447 |
| 2008/0173130 | A1 | | 7/2008 | Zhang et al. |

FOREIGN PATENT DOCUMENTS

| | | |
|---|---|---|
| JP | 50-35273 Y1 | 10/1975 |
| JP | 63-125247 U | 8/1988 |
| JP | 64-25552 U | 2/1989 |
| JP | 2003-232411 A | 8/2003 |
| JP | 2007-205450 A | 8/2007 |
| JP | 2008-180259 A | 8/2008 |

OTHER PUBLICATIONS

International Search Report (PCT/ISA/210) issued on Jul. 17, 2012, by the Japanese Patent Office as the International Searching Authority for International Application No. PCT/JP2012/003376.

* cited by examiner

*Primary Examiner* — Ha D Ho
(74) *Attorney, Agent, or Firm* — Buchanan Ingersoll & Rooney PC

(57) ABSTRACT

A wave generator for a wave gear device is provided with a pair of first rollers arranged in a position that is point-symmetric in relation to the center of a flexible externally toothed gear, a pair of second rollers, and a pair of third rollers. The first rollers are located on a long axis of the flexible externally toothed gear that is being flex into an ellipsoidal shape, and the second and third rollers are located in positions that are linearly symmetric in relation to the long axis between the long axis and a short axis. Support bearings of the first rollers are larger than those of the second and third rollers. The rolling fatigue life of a roller-type of the wave generator can be to be enhanced.

4 Claims, 5 Drawing Sheets

(a)

(b)

WAVE GENERATOR FOR WAVE GEAR DEVICE

TECHNICAL FIELD

The present invention relates to a wave gear device, and in particular to a roller-type wave generator for causing a flexible externally toothed gear to engage with a rigid internally toothed gear, the externally toothed gear being flexed into an ellipsoidal shape by a plurality of rollers.

BACKGROUND ART

Six-roller-type wave generators for wave gear devices are known in the art. Wave generators of this type are provided with six rollers for causing the flexible externally toothed gear of the wave gear device to be flexed into an appropriate ellipse-like shape. One pair of these rollers is arranged in symmetrical positions on the long axis of the ellipse-like shape, and the remaining two pairs of rollers are arranged so as to be in linear symmetry in relation to the long axis between the long axis and short axis of the ellipse-like shape. This type of wave generator is disclosed in FIG. 3 of Patent Document 1.

PRIOR ART DOCUMENTS

Patent Documents

Patent Document 1: JP-A 2003-232411, paragraph 0026, FIG. 3

SUMMARY OF THE INVENTION

Problems the Invention is Intended to Solve

Traditionally, small-diameter rollers of the same size, i.e., rollers all having support bearings of the same size, have been used in six-roller-type wave generators. The service life of a wave gear device provided with a roller-type wave generator is determined by the dynamic load rating of the roller support bearing, and the rotation speed. Attention has not been paid to improving the rolling fatigue life of roller-type wave generators, and no countermeasures have been proposed for that.

With the foregoing problems in view, it is an object of the present invention to provide a roller-type wave generator of a wave gear device aimed at improving rolling fatigue life.

Means for Solving the Problems

The present inventors directed their attention at a characteristic load distribution arising in a wave generator during load operation of a wave gear device, and based on this, achieved an improvement of the rolling fatigue life of a roller-type wave generator. Namely, in the wave gear device, the distribution of load arising at each portion in the circumferential direction of the wave generator changes for each reduction ratio. Therefore, in the present invention, the size of each of the roller support bearings is determined to match the distribution of load in the wave generator.

Typically, the greatest load is the load acting on the pair of rollers located on the long axis of the flexible externally toothed gear flexed into an ellipse-like shape. Therefore, the support bearings of the pair of rollers should be made larger than the support bearings of rollers arranged in a position other than on the long axis. This makes it possible to extend the life of the rollers on the long axis, which bear a large load, allowing the life of the wave generator to be significantly longer than when rollers of the same size are used, as in the past.

In a case where the reduction ratio of a wave gear device is a high reduction ratio, i.e., 80 or higher, the load acting on the pair of rollers in the position on the long axis becomes particularly high compared to the load acting on the other two pairs of rollers. Therefore, the wave generator according to the present invention can make the service life of the wave generator dramatically longer than the prior art when used in a wave gear device with a reduction ratio of 80 or higher, making it particularly effective.

MODE FOR CARRYING OUT THE INVENTION

Described below is an embodiment of a wave gear device according to the present invention, made with reference to the drawings.

Figure 1:
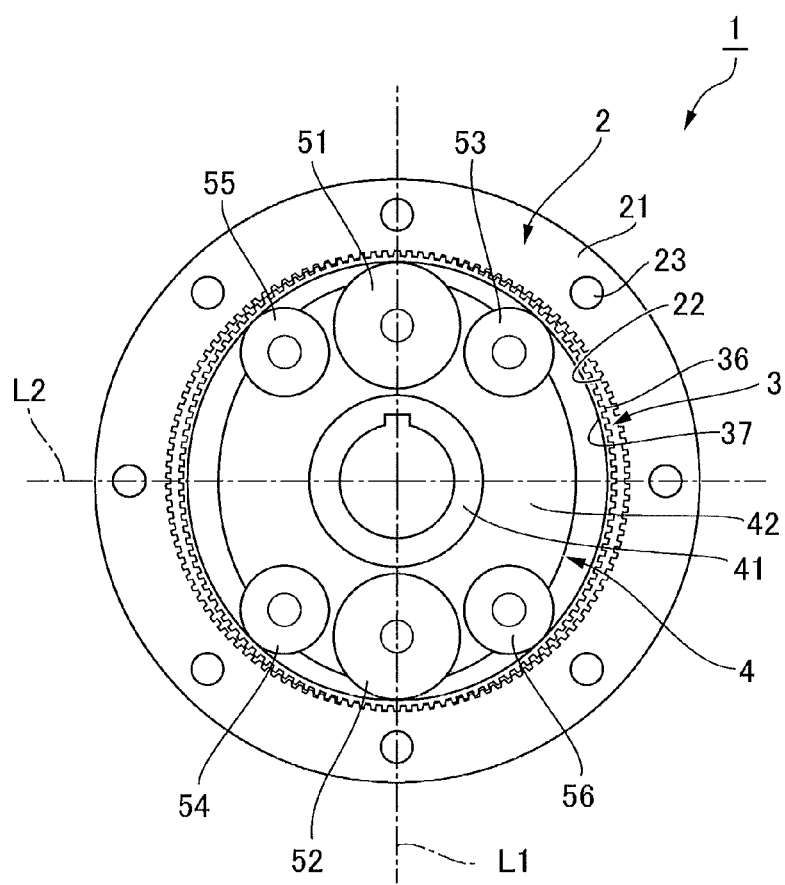
FIG. 1 is a schematic front view of a wave gear device in which the present invention is used.
Figure 2:
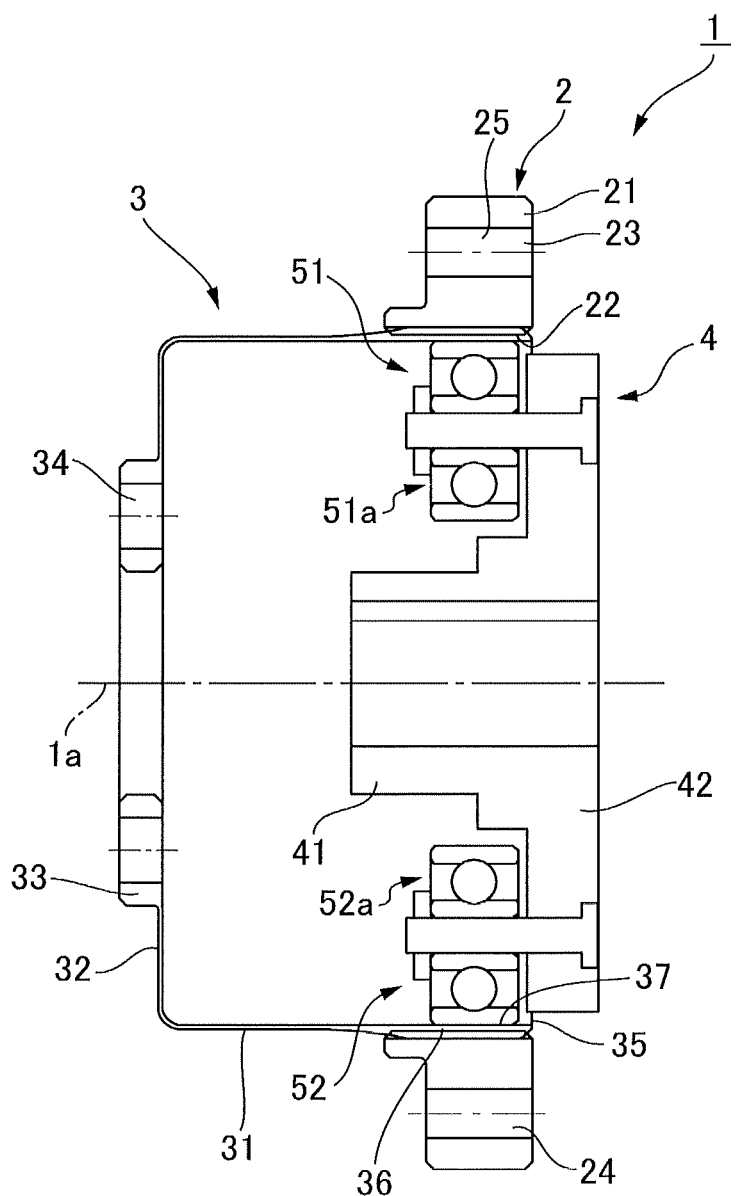
FIG. 2 is a schematic longitudinal sectional view of the wave gear device in FIG. 1.
Figure 3:
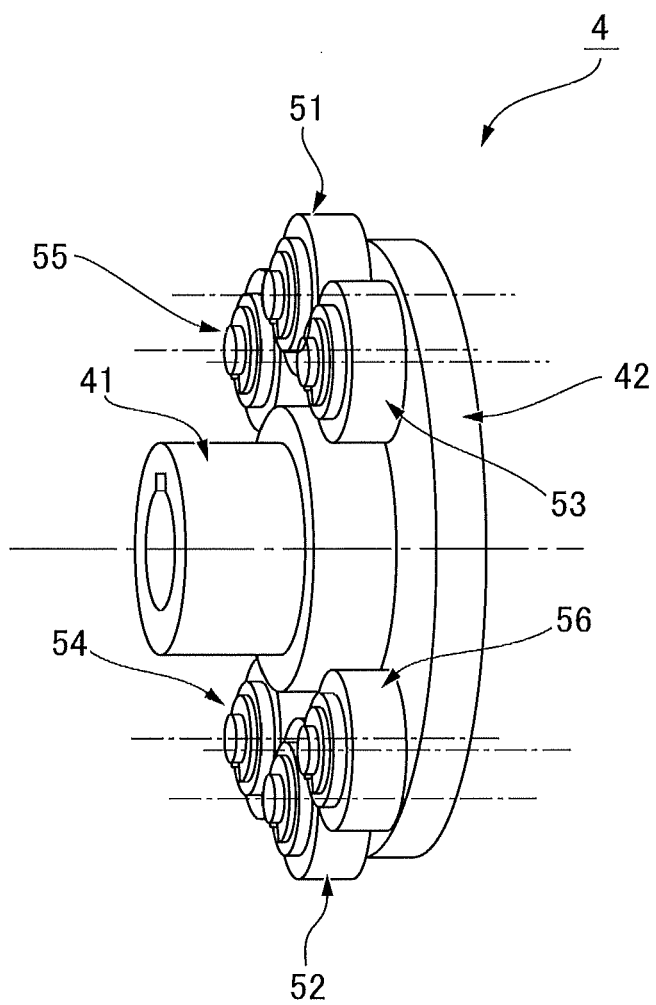
FIG. 3 is a perspective view of a wave generator of the wave gear device in FIG. 1.

Reference is made to FIGS. 1 to 3 in the following description. A wave gear device 1 according to this embodiment is a "cup-type" device having an annular, rigid internally toothed gear 2; a cup-shaped, flexible externally toothed gear 3 arranged on the inner side of the rigid, internally toothed gear 2; and a six-roller-type wave generator 4 arranged on the inner side of the flexible externally toothed gear 3. The flexible externally toothed gear 3 is flexed by the wave generator 4 into an ellipsoidal shape or a substantially ellipsoidal shape, meshing with the rigid internally toothed gear 2 on the long axis L1.

When the wave generator 4 is caused to rotate at high speed by the motor (not shown), the meshing location of gears 2, 3 moves in a circumferential direction, and relative rotation corresponding to a difference 2n (n being a positive integer) in the number of teeth between gears 2, 3 occurs between gears 2, 3. The difference in number of teeth is typically assumed to be 2; and if, e.g., the rigid internally toothed gear 2 is secured so as not to rotate, the flexible externally toothed gear 3 will rotate at a rotation speed that is dramatically lower than the rotation of the wave generator 4 (input rotation), making it possible to bring the reduced rotation speed out to the load from the flexible externally toothed gear 3.

The rigid internally toothed gear 2 is provided with an annular rigid member 21, and internal teeth 22 formed on the round inner periphery of the rigid member 21. Bolt holes 23 are formed at designated intervals along the circumferential direction of the rigid member 21, the bolt holes 23 passing through the rigid member 21 in the direction of the device centerline 1a.

The cup-shaped flexible externally toothed gear 3 is provided with a cylindrical body 31 capable of flexing in a radial direction, a diaphragm 32 connecting to a trailing edge of the cylindrical body 31 and widening inward in the radial direction, and a thick-walled annular boss 33 formed continuously with the inner peripheral edge of the diaphragm 32. Attachment bolt holes 34 are formed on the boss 33 at designated angular intervals in the circumferential direction. External teeth 36 are formed on the outer periphery portion of the cylindrical body 31 at the side of an opening edge 35 of the cylindrical body 31.

A six-roller-type wave generator 4 is provided with a hollow input shaft 41; a support disk 42 coaxially secured to the outer periphery of the hollow input shaft 41, or formed as an integral part with the hollow input shaft 41; and six rollers 51 to 56 attached to the support disk 42. Rollers 51, 52 are a pair of first rollers, arranged in point-symmetric positions in relation to the center (device centerline 1a) of the flexible externally toothed gear 3. Rollers 53, 54 are a pair of second rollers similarly arranged in point-symmetric positions relative to the center of the flexible externally toothed gear 3; and rollers 55, 56 are a pair of third rollers, also arranged in point-symmetric positions relative to the center of the flexible externally toothed gear 3.

The pair of first rollers 51, 52 is positioned on the long axis L1 of the ellipsoidally flexed flexible externally toothed gear 3, and is in contact with the internal peripheral surface 37 of the flexible externally toothed gear 3 in a state where the portion of the internal peripheral surface 37 on which the external teeth 36 are formed in the flexible externally toothed gear 3 is flexed outward. The pair of second rollers 53, 54 is arranged in positions rotated a designated angle clockwise from the long axis L1 between the long axis L1 and the short axis L2, and is in contact with the internal peripheral surface 37 in a state where the portion of the internal peripheral surface 37 on which the eternal teeth 36 is formed in the flexible externally toothed gear 3 is flexed outward. Similarly, the pair of third rollers 55, 56 is located in positions that are bilaterally symmetrical with the pair of second rollers 53, 54 with respect to the long axis, and is in contact with the internal peripheral surface 37 of the flexible externally toothed gear 3 in a state where the internal peripheral surface 37 of the flexible external toothed gear 3 is flexed outward.

The first rollers 51, 52 are the same size, and support bearings 51a, 52a for the rollers are the same size. The second rollers 53, 54 and third rollers 55, 56 are the same size, and the support bearings for those rollers are the same size. However, the support bearings 51a, 52a for the first rollers 51, 52 are larger than the support bearings for the second and third rollers 53 to 56, and have a high dynamic load rating. When the wave gear device 1 is in load operation, the sizes of the rollers 51 to 56 in the first through third pairs are determined on the basis of the load operating on each of the rollers 51 through 56.

Since rollers 51 through 56 sized to match the distribution of loads in the wave generator 4 during load operation are used in the wave gear device 1, the service life of the wave gear device 1 can be efficiently improved. For example, in the wave gear device 1 with a reduction ratio of 100 shown in FIGS. 1 and 2, the calculated service life was confirmed to approximately 2.2 times higher when rollers 51, 54 were 14 mm in diameter and the other rollers 53 through 56 were 12 mm in diameter, than when each of the rollers 51 through 56 of the wave generator 4 were all 12 mm in diameter.

Figure 4:
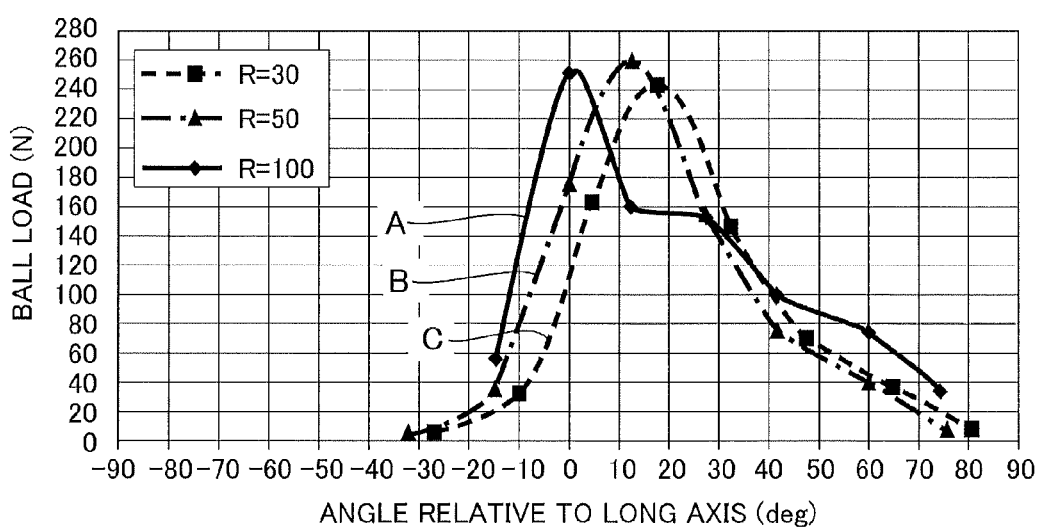
FIG. 4 is a graph that shows an example of a measurement of the state of distribution of loads arising in each position in the circumferential direction of a wave generator during load operation in a case when the reduction ratio of the wave gear device shown in FIG. 1 is changed.
Figure 5:
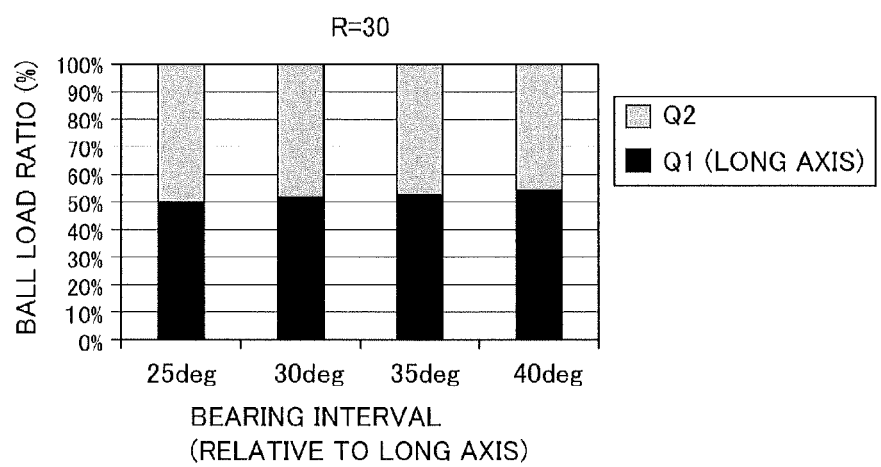
FIG. 5 is a graph that shows the ratio (%) between the load in each angular position relative to the long axis and the load at the long-axis position in (a) a case when the reduction ratio is 30, and (b) a case when the reduction ratio is 100.
Figure 5:
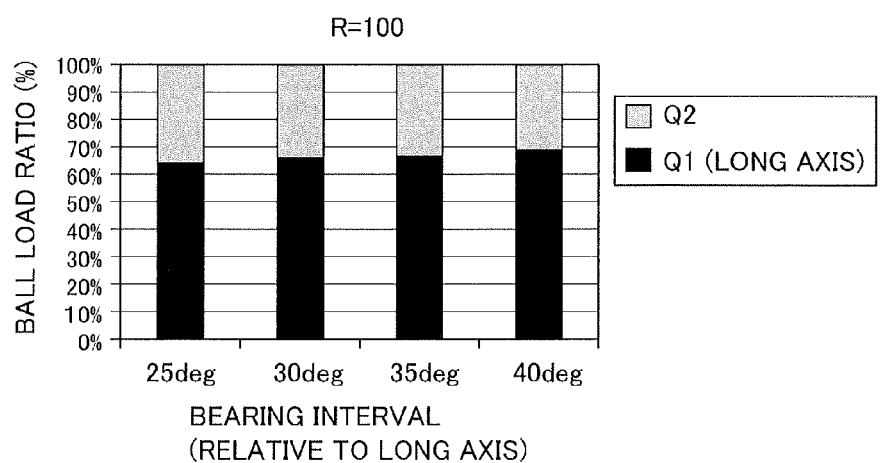

FIG. 4 is a graph showing measurement examples of the state of distribution of loads occurring in each position in the circumferential direction on the wave generator 4 during load operation when the reduction ratio was changed in the wave gear device shown in FIGS. 1 and 2. The solid-line curve A, the dashed-dotted-line curve B, and the dashed-line curve C represent load distribution curves of 100, 50, and 30, respectively. FIG. 5 is a graph showing the ratio (%) of the load at the long-axis position for each angular position relative to the long axis, where in (a) the reduction ratio is 30 and in (b) the reduction ratio is 100.

As can be understood from the drawings, when the reduction ratio is 100, the load peak occurs substantially in the long-axis position. Furthermore, compared to the long-axis position, the load is significantly reduced in positions corresponding to the angular positions set apart from the long axis; i.e., the angular positions from 35 to 40° where rollers 53, 54 and 55, 56 are arranged. By contrast, at a reduction ratio of 50 or 30, the load peak occurs at angular positions offset by 10 to 20° in the rotation direction relative to the long-axis position. Therefore, no appreciable load difference occurs between the long-axis position where rollers 51, 52 are arranged and the position corresponding to the angular position where rollers 53, 54 and rollers 55, 56 are arranged, the load in the long-axis position being only slightly larger.

In either case, for rotation in either direction, the average load acting on rollers 51, 52 in the long-axis position is larger than the average load at the positions of the other rollers 53 through 56, indicating that making the rollers 51, 52 in the long-axis position larger than the remaining rollers 53-56 is effective. Furthermore, in a case with a high reduction ratio of 100, the load peak occurred substantially at the long-axis position, with the load at angular positions set apart from the long-axis position being smaller, indicating that arranging the larger rollers 51, 52 at the long-axis position and reducing the size of the rollers 53 through 56 arranged in positions set off the long-axis position was extremely effective in improving the service life of the wave generator 4.

According to experiments performed by the present inventors, in a wave gear device with a high reduction ratio, i.e., 80 or higher, the load peak occurred substantially in the long-axis position, with the load at angular positions set off from the long-axis position being smaller, confirming that arranging the larger rollers in the long-axis position and reducing the size of the rollers arranged at positions set off from the long-axis position was effective in improving the service life of the wave generator.

Other Embodiments

The above example is a case in which a six-roller-type wave generator is used on a cup-shaped wave gear device 6. The present invention can also be similarly applied to a "silk-hat-type" wave gear device provided with a silk-hat-shaped flexible externally toothed gear. The present invention can also be similarly applied to a "flat-type" wave gear device in a configuration in which a cylindrical, flexible externally toothed gear is located coaxially on the inner side of two rigid internally toothed gears.

Furthermore, the present invention can also be similarly applied to a roller-type wave generator provided with more than six rollers. For example, the present invention can also be applied to a wave generator with a total of ten rollers, provided with four pairs of rollers in addition to the single pair of rollers on the long axis. In this case, the pair of rollers on the long axis should be the largest, the two pairs of rollers located on either side of the pair of first rollers being smaller than the rollers on the long axis, and the remaining two pairs of rollers located on either side of the second two pairs of rollers being the smallest.

The invention claimed is:

1. A wave generator for a wave gear device, which causes to flex a flexible externally toothed gear in a predetermined ellipse-like shape to partially mesh with a rigid internally toothed gear, and moves meshing position of the both gears in a circumferential direction in concert with rotation thereof, whereby relative rotation corresponding to a difference in number of teeth between the gears is occurred between the gears, the wave generator comprising:
   a plurality of rollers for contacting an inner periphery of the flexible externally toothed gear and causing the flexible externally toothed gear to flex into the ellipse-like shape;
   the plurality of rollers including two first rollers arranged on a long axis of the ellipse-like shape, two second rollers arranged in positions not on the long axis, and two third rollers arranged in positions not on the long axis; and
   the second rollers being arranged in a symmetrical position in relation to a center of the ellipse-like shape, and between the long axis and the short axis of the ellipse-like shape;
   the second rollers being positioned within an angular range of 35 to 40 degrees from the long axis around the center of the ellipse-like shape:
   the third rollers being arranged in a linearly symmetrical position in relation to the second rollers, with respect to the long axis;
   the second rollers and the third rollers being provided with support bearings of the same size;
   the first rollers being provided with support bearings having a size and a dynamic load rating larger than those of the support bearings of the second rollers; and being adapted to be used in a wave gear device having a reduction ratio of 80 or higher.

2. The wave generator for a wave gear device of claim 1, wherein:
   the size of the support bearings of the first rollers and the size of the support bearings of the second rollers are set on the basis of a load acting on each of the rollers during load operation of the wave gear device.

3. The wave generator for a wave gear device of claim 1, wherein:
   the sizes of the respective support bearings of the first, second and third rollers, and positions of the first, second and third rollers are set on the basis of a load acting on each of the rollers during load operation of the wave gear device.

4. A wave gear device comprising:
   a rigid internally toothed gear;
   a flexible externally toothed gear arranged coaxially on an inner side of the rigid internally toothed gear, the flexible externally toothed gear being capable of flexing in a radial direction; and
   a wave generator for causing the flexible externally toothed gear to flex into an ellipse-like shape and the flexible externally toothed gear to mesh with the rigid internally toothed gear in a location on a long axis of the ellipse-like shape;
   wherein a reduction ratio of the wave gear device is 80 or higher, and the wave generator is one as set forth in claim 1.

* * * * *